(12) United States Patent
Le

(10) Patent No.: US 9,053,107 B1
(45) Date of Patent: Jun. 9, 2015

(54) DETERMINING UPDATES FOR FILES BASED ON AN ORGANIZATION OF THE FILES ON DIFFERENT BLOCKS OF A STORAGE DEVICE

(75) Inventor: Thieu Le, Livermore, CA (US)

(73) Assignee: Google Inc., Mountain View, CA (US)

( * ) Notice: Subject to any disclaimer, the term of this patent is extended or adjusted under 35 U.S.C. 154(b) by 394 days.

(21) Appl. No.: 13/312,949

(22) Filed: Dec. 6, 2011

(51) Int. Cl.
*G06F 17/30* (2006.01)
*G06F 15/16* (2006.01)

(52) U.S. Cl.
CPC ...... *G06F 17/30067* (2013.01); *G06F 17/3023* (2013.01)

(58) Field of Classification Search
CPC .................. G06F 17/30067; G06F 17/3023
See application file for complete search history.

(56) References Cited

U.S. PATENT DOCUMENTS

| | | | |
|---|---|---|---|
| 6,681,305 B1 | 1/2004 | Franke et al. | |
| 7,496,841 B2 * | 2/2009 | Hadfield et al. | 715/255 |
| 7,606,812 B2 * | 10/2009 | Perrin et al. | 1/1 |
| 8,407,445 B1 * | 3/2013 | Pathak et al. | 711/170 |
| 2005/0131990 A1 * | 6/2005 | Jewell | 709/201 |
| 2005/0132179 A1 * | 6/2005 | Glaum et al. | 713/1 |
| 2006/0277226 A1 * | 12/2006 | Chikusa et al. | 707/201 |
| 2007/0094312 A1 * | 4/2007 | Sim-Tang | 707/204 |
| 2011/0167419 A1 * | 7/2011 | Ishikawa | 717/171 |

OTHER PUBLICATIONS

"File System/Autoupdate—The Chromium Projects", retrieved from <http://www.chromium.org/chromium-os/chromiumos-design-docs/filesystem-autoupdate>, retrieved on Apr. 27, 2011, pp. 1-4.
"File System/Autoupdate Supplements—The Chromium Projects", retrieved from <http://www.chromium.org/chromium-os/chromiumos-design-docs/filesystem-autoupdate-supplements>, retrieved on Apr. 27, 2011, pp. 1-3.
"Autoupdate Details—The Chromium Projects", retrieved from <http://www.chromium.org/chromium-os/chromiumos-design-docs/autoupdate-details>, retrieved on Apr. 27, 2011, pp. 1-5.

* cited by examiner

*Primary Examiner* — Tarek Chbouki
(74) *Attorney, Agent, or Firm* — McDermott Will & Emery LLP

(57) ABSTRACT

Configurations for only transmitting modified files in a file system update over a network to a target computer system are provided. The target computer system can store a root file system on a storage device. The subject technology determines differences between a previous image of the root file system and a new (e.g., updated) image of the root file system. When a file has not been updated or modified, the subject technology does not transmit the file in an update over the network to the target computer system. The root file system includes metadata that at least describes the location of each file on the storage device. For a file in which the position is preserved (i.e., unchanged), the location metadata for that file is not changed. The subject technology therefore forgoes transmitting the unmodified metadata over the network.

26 Claims, 6 Drawing Sheets

DETERMINING UPDATES FOR FILES BASED ON AN ORGANIZATION OF THE FILES ON DIFFERENT BLOCKS OF A STORAGE DEVICE

BACKGROUND

In a given operating system, updates to files can occur to provide additional functionality or to correct bugs within the operating system.

SUMMARY

The subject technology provides for updating a collection of files based on an organization of the files on different blocks of a storage device. The subject technology preserves locations of one or more files in a file system update. The subject technology then determines an updated set of files that have been modified in the file system update in order to update an old file system image. The updated set of files updates a corresponding old set of files in the old file system image. The subject technology determines whether an old set of metadata associated with the old set of files is modified based on the updated set of files. The subject technology then generates a set of updated files based on a binary difference of the updated set of files and the old set of files. Additionally, the subject technology generates an updated set of metadata for the updated set of files based on a binary difference between a new set of metadata and the old set of metadata if the old set of metadata is modified, in which the updated set of metadata includes location information of the updated set of files.

The subject technology further provides a system for updating a collection of files based on an organization of the files on different blocks of a disk. The system includes memory, one or more processors, and one or more modules stored in memory and configured for execution by the one or more processors. The system includes a delta update module configured to determine an updated set of files that have been modified in a file system update in order to update an old file system image in which the updated set of files updates a corresponding old set of files in the old file system image, and configured to determine whether an old set of metadata associated with the old set of files is modified based on the updated set of files, and generate a set of updated files based on the updated set of files. The system further includes a metadata generator module configured to generate an updated set of metadata for the updated set of files if the old set of metadata is modified in which the updated set of metadata includes location information of the updated set of files.

Yet another aspect of the subject technology provides for preserving locations of one or more files in a file system update. In some configurations, preserving the file location minimizes the amount of changes to metadata. The subject technology determines an updated set of files that have been modified in the file system update in order to update an old file system image in which the updated set of files updates an old set of files in the old file system image. The subject technology determines whether an old set of metadata associated with the old set of files is modified based on the updated set of files. The subject technology then generates a set of updated files based on a binary difference of the updated set of files and the old set of files. Additionally, the subject technology generates an updated set of metadata for the updated set of files based on a binary difference between a new set of metadata and the old set of metadata if the old set of metadata is modified, in which the updated set of metadata includes location information of the updated set of files. One or more locations of free space in an updated file system image are then determined. The subject technology performs a write operation in the one or more locations of free space in the updated file system image in which the write operation writes one or more zeros in the locations of free space. The set of updated files is transmitted over a network to a target system in which the second file system image updates a file system stored on the target system. Additionally, the subject technology transmits the updated set of metadata over the network to the target system if the first set metadata is modified.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
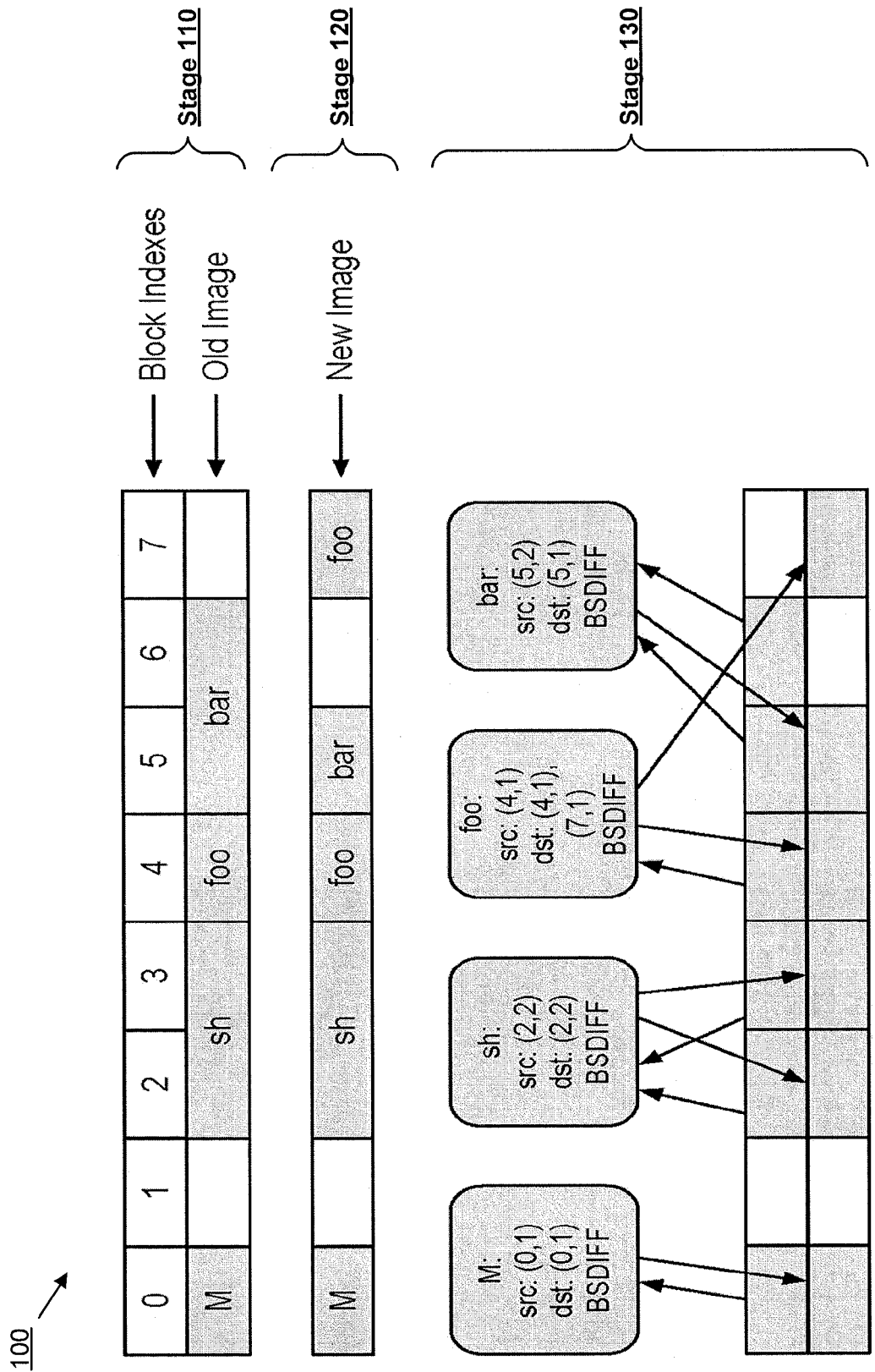
FIG. 1 conceptually illustrates an example process for applying delta compression to a disk image.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

From time to time different features of an operating system are updated. Those updates may be sent to one or more client computers (e.g., a target system(s)) that perform a predefined update process. This may involve deleting, changing and/or adding files to the client. In one process, an update is prepared by the operating system provider. This may include creating a differential update file, which indicates to the client what changes need to be made. The differential update file is then sent to each client to be updated. Each client can sequentially execute the operations in the file to perform the update.

A partition containing an operating system may be configured as one or more blocks, with each block containing file information or bookkeeping information. Each block may be a predetermined size (e.g., 4 kilobytes), although the subject technology is not limited to this block size. When updating the operating system, a new partition may be created. The new partition is pre-populated with the old version of the operating system. Each disk block on a resultant install partition (which will contain a root file system) is exactly (bit for bit) specified by the operating system vendor so that it can be signed on the server (e.g., for a verified boot).

In one example, the update file is an ordered list of operations to be performed by the client (e.g., the target system). Each operation operates on specific blocks of the partition. Each operation can contain an optional data "blob" inside the update file. The term "blob" indicates a large chunk of data that may have an arbitrary collection of bytes. There are several types of install operations, including "Copy," "Diff", "Replace" and "Replace with Uncompression." In Copy, some of the blocks in the current install partition are copied over to other blocks in the new install partition. For Diff, some blocks are read into memory, and a binary difference routine is performed using an attached data blob. The results are written into specified blocks in the new install partition. For Replace, the attached data blob is written to specified blocks in the new install partition. A compression process may also be performed, where a compressed data blob is sent to the client, uncompressed, and the results are written to specified blocks in the new install partition. For instance, Gzip, Bzip2 or any other compression algorithm can be employed by the compression process.

After setting the file data, the client will overwrite the non-file-data blocks with a final "InstallOperation" command that unzips or decompresses the remaining data into all non-file-data blocks. In one example, this is about 2 megabytes of data compressed. It may be feasible to perform a delta compression process on this data as described in further detail below.

A root file system for an operating system (OS) can be periodically updated to incorporate, for example, bug fixes, additional features and other updates to existing files for the OS. The root file system includes core components/files of the OS stored in different blocks of a storage device. Previously, updating the root file system required transmitting the entire root file system for the OS over the network (e.g., when stored on a remote server) to a target computer system. The target computer system would then update the OS on the system with the updated root file system. However, only a subset of files in the root file system are typically modified in an update for the OS. Redundant data would therefore be transmitted over the network to the target computer system.

To more efficiently update the root file system, the subject technology provides implementations for only transmitting the modified files in the update over the network to the target computer system. In one example, the target computer system can store the root file system on a solid-state drive (SSD) or similar storage device (e.g., hard disk, flash memory, etc.). The root file system includes metadata that describes the location of each file at the sector or block level of the SSD for the root file system. For the set of updated files, the subject technology maintains a metadata set that indicates the respective positions for each of the updated files at the block level of the SSD for the root file system. For a file in which the position is preserved (i.e., unchanged), the metadata for that file is not changed. The subject technology therefore forgoes transmitting the unmodified metadata over the network.

In some configurations, the metadata can include the following types of information. For instance, the metadata can include the following information: 1) location, 2) creation, modification and access timestamps, 3) directory entries for one or more directories, 4) bitmap information (free space and inode), and 4) file system information (superblock, copies of superblock, block groups, etc.). Other types of information can be included in the metadata and still be within the scope of the subject technology.

In some configurations, the root file system for OS is hashed at the block level of the disk to ensure the integrity of the root file system. For instance, the target system can then verify the updated file system image by checking that each hash matches an expected value (e.g., a previously calculated hash value). Free space can be understood as locations at the block level of the disk where no metadata or file is stored (e.g., as indicated by metadata). However, free space at the block level can still contain data (e.g., garbage data). Any free space in the updated root file system image therefore can also be also hashed. Consequently, the subject technology also transmits the free space over the network to the target computer system to update the root file system on the target computer. To more efficiently transmit the free space, the subject technology in some configurations performs a write operation that writes zeros at the locations of free space in the updated root file system image. By writing zeros in the locations of free space, the subject technology can compress the free space which results in a smaller set of data transmitted over the network.

Thus, it should be understood that implementations of the subject technology determine differences between a previous image of the root file system and a new (e.g., updated) image of the root file system. By way of example, if a file named "Foo" has not been updated or modified, the subject technology does not transmit file "Foo" in an update over the network to the target computer system.

Additionally, in a case in which the location of the file "Foo" on the storage device (e.g., SSD, hard disk, etc.) has changed, the subject technology includes a command (e.g., a copy operation) that instructs the target computer system to copy the file at the current location (e.g., current block(s) on the storage device) to the new location (e.g., different block(s) on the storage device). The included command is not as computational resource-intensive (e.g., network bandwidth, CPU usage, etc.) as sending a full copy of the file but the included command does occupy space in the update. Therefore, the subject technology minimizes unnecessary commands (e.g., in an instance in which the file has not moved locations on the storage device in the update) which lowers the payload size in the update. Furthermore, the copy command uses a write cycle (e.g., which are limited on a SSD), so removing the unnecessary writes extends the life of the storage device. In an example in which the storage device is an SSD, another benefit of the subject technology is that SSD write performance can vary depending on the specifications of the SSD due to write amplification. Thus, the subject technology can minimize the number of write operations to avoid adversely affecting the user since the update can be applied in the background while the user is utilizing the target computer system (e.g., web browser, running applications, etc.).

Although the above example describes one or more operations for a root file system of an operating system, the subject technology can apply for other types of file systems and still be within the scope of the subject technology. For instance, an operating system may not utilize a root file system in some configurations. The subject technology can still perform the delta compression techniques and other described operations herein for an operating system(s) without a root file system. For instance, the subject technology can update one or more files of an operating system located in one or more blocks of a disk. Additionally, the subject technology is applied to any file systems that may or may not be related to the operating system (e.g., data volumes).

An example process 100 for applying delta compression to a disk image is shown in FIG. 1. In particular, FIG. 1 shows the process 100 in different stages 110, 120 and 130. At stage 110, the process 100 scans a disk image including different blocks. Block indices (0-7) may be associated with different files (e.g., files "sh," "foo" and "bar" as shown in FIG. 1).

At stage 120, the process 100 associates new file images with the same or different blocks from the disk image in stage 110. As shown in stage 120, the file "sh" is located in the same blocks 2 and 3, the file "foo" is located in different blocks 4 and 7, and the file "bar" is located in block 5. More specifically, the stage 120 illustrates that the file "sh" is modified between the two disk images but its size did not change, the file "foo" is extended into block 7, and the file "bar" is shrunken. In order to provide delta compression optimizations as described herein, locations of files are preserved from the old disk image to the new disk image, if possible.

At stage 130, the process 100 creates one or more file operations for updating the old disk image from stage 110. In one example, the file operations correspond to respective files on a new partition. As shown in stages 110 and 120, respective metadata resides in block 0. At stage 130, the process 100 uses a BSDIFF operation for the metadata in the respective blocks 0 to update the metadata (location, timestamps, etc.) of one or more files from the old image to the new image. BSDIFF is an algorithm or technique that determines the difference(s) between two files or sets of metadata. The BSDIFF operation shrinks the update payload size because only the differences between the two sets of metadata are included or sent in order to provide an updated disk image. More specifically, to minimize metadata changes, the process 100 attempts to place a file in the same location or block as much as possible. This minimizes the update payload because: a) it keeps most of the metadata the same and b) it prevents shuffling of files around on a client device, thus speeding up the update process.

FIG. 1, as further shown in stage 130, illustrates a blocks vector. A blocks vector is an ordered list, where each element includes a file operation (e.g., BSDIFF as shown in FIG. 1) for a given block. Each updated file image may have one or more source blocks and one or more destination blocks. Thus, the source block for "foo" is block 4 (as shown as "src: (4,1)"), and its destination blocks are shown as "dst: (4,1), (7,1)," indicating that the first block is block 4, the second block is block 7, and there are 2 blocks allocated. This portion also shows that each updated file image is provided to the client using a binary difference algorithm such as BSDIFF in order to determine a binary difference between an old file image and a new file image.

Figure 2:
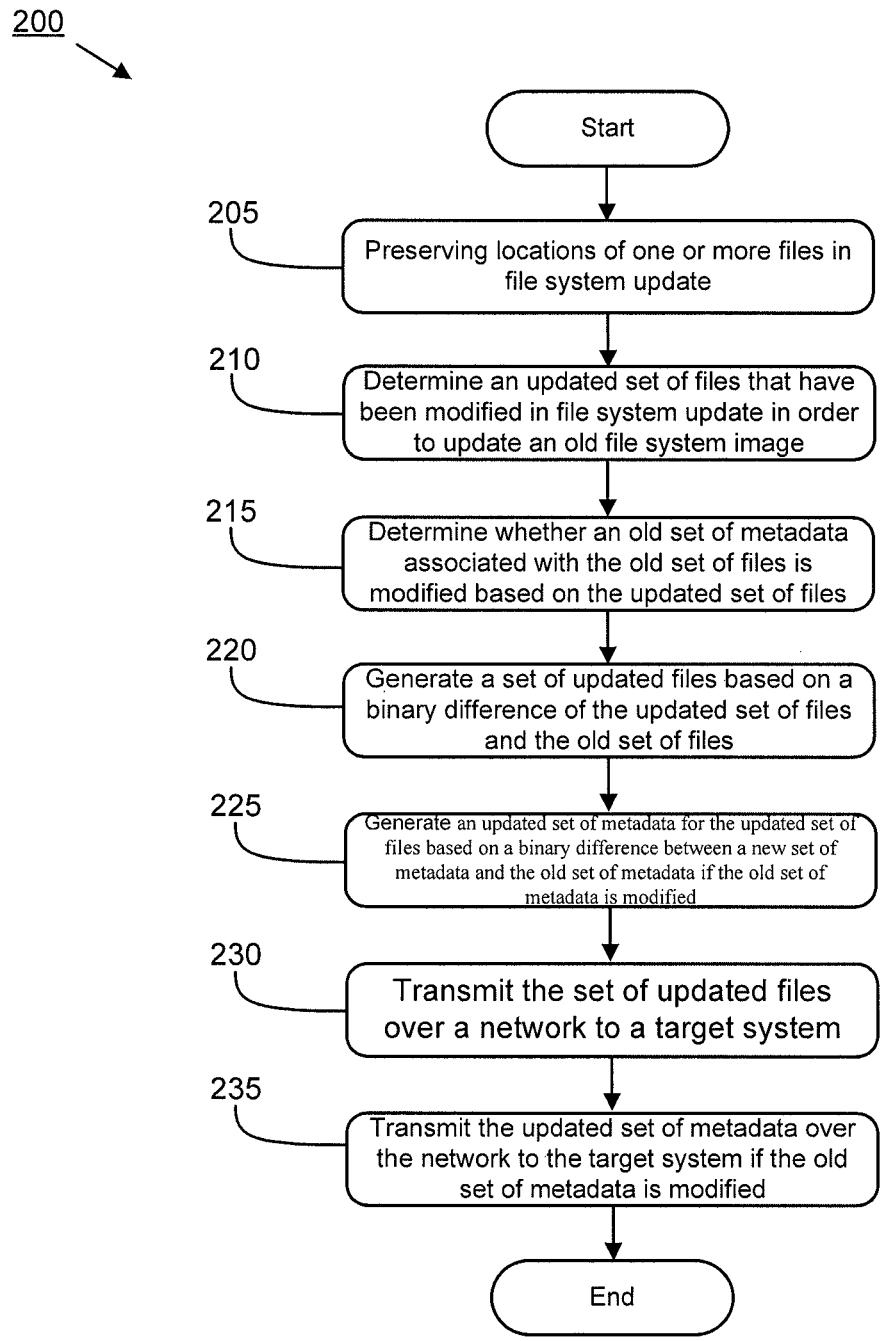
FIG. 2 conceptually illustrates an example process for updating a collection of files based on an organization of the files on different blocks of a storage device.

FIG. 2 conceptually illustrates an example process 200 for updating a collection of files based on an organization of the files on different blocks of a storage device. More specifically, the process 200 can transmit one or more updated files to a target system storing the collection of files (e.g., a file system of an operating system) to update the files stored by the target system. In one example, the target system transmits a request to initiate an update in which a version number of a file system stored on a storage device is included in the request. After receiving the update request, the process 200 can perform the operations described in further detail below. The process 200 will be described by referring to portions of FIG. 1.

The process 200 begins at 205 by preserving locations of one or more files in a file system update. By way of example, the process 200 at 205 can place as many file blocks in the file system update in a same location as possible. Referring to FIG. 1, the file "sh" is kept in the same location between the old and new images. If a new/updated file is larger than a corresponding original file, then the new blocks will be allocated from free space. Referring to FIG. 1, the file "foo" is larger in the new file image and the new block is allocated from block 7, which was free space in the old file image. If the new file is smaller than the original file, any extra blocks are deallocated into free space. As used herein, free space can be understood as a location(s) at the block level of the disk where no file(s) or metadata is stored. Referring to FIG. 1, the file "bar" is shrunken in the new image by preserving the location at block 5, and the block 6 is deallocated into free space.

The process 200 at 210 determines a set of files that have been modified in the file system update in order to update an existing file system image. The file system update of some configurations can be understood as a new file system image that includes updates to the set of files and represents an updated version of the old file system. Referring to FIG. 1, the new file image shown in stage 120 represents the set of updated files. In one example, the set of updated files are updated versions of a corresponding set of files in the old file system image. For instance, the new file system image includes one or more different files and can correspond to an image of a file system for an operating system. The file system (that includes the files that are to be updated) can be stored on a partition of a storage device on a target system. The updated set of files includes a subset of a total number of files of a file system that have been modified in the file system update in one example. By way of example, the process 200 determines the updated set of files by iterating through each file in the file system update (e.g., the aforementioned new file system image) and determines each updated file from the old file system (e.g., the current file system stored on the target system). More specifically, iterations are performed over each file on the new file system to obtain an ordered list of all data blocks included.

The process 200 at 215 determines whether a set of metadata associated with the set of files in the old file system image is modified based on the updated set of files. In this regard, the process 200 at 215 compares all of the metadata to determine whether a modification to the metadata has occurred. In one example, the old set of metadata includes location information of the old set of files at a block level of the storage device. In some configurations, the metadata specifies the location information by a contiguous range of disk blocks (such as an extent that represents a contiguous range of disk blocks). Alternatively, the location information can be specified utilizing one or more specific blocks.

Further, the process 200 at 215 can determine the location information of the old set of files is modified (e.g., when compared to the new set of files in the file system update) from the respective locations of the current files of the file system at the block level of the storage device (e.g., as currently stored on the target system). Thus, in one example, determining whether the old set of metadata associated with the old set of files is modified is implemented by determining whether a location of a file of the old set of files is modified from a corresponding location at the block level of the storage device. In this instance, the metadata for the file has changed. However, in some instances, the location information is not modified (e.g., the location of the files is unchanged) and the process 200 at 215 can determine that that metadata has been modified based on other types of metadata mentioned above (e.g., creation, modification and access timestamps, directory entries, bitmap information, and file system information, etc.).

The process 200 at 220 generates a set of updated files based on a binary difference of the updated set of files and the old set of files. In one example, each file of the set of updated files includes an ordered list of one or more operations to perform. Referring to FIG. 1, the ordered list of operations can be included in a blocks vector in the stage 130 as described above in which a binary difference operation (e.g., BSDIFF) is utilized to determine the differences, at the block level, between corresponding respective files in the new file system image and the old file system image. Each operation operates on one or more blocks of a file system on a storage device (e.g., disk) of a target system. In addition to the aforementioned binary difference operation, the operation can include a copy operation that includes instructions to read data from a first location and copy the data to a second location. The copy operation can include instructions to read data in one or more initial blocks or blocks (e.g., on the storage device of the target system) and write the data to one or more different blocks. Further, a write operation can be included that determines a difference between a first file in the first file system image and a corresponding second file in file system update and writes the difference to the location of the first file (e.g., on the storage device of the target system). In this example, the location of the file has not changed in the file system update.

The process 200 at 225 generates an updated set of metadata for the updated set of files based on a binary difference between a new set of metadata and the old set of metadata if the old set of metadata is modified, in which the updated set of metadata includes location information of the updated set of files. Referring to FIG. 1, the updated set of metadata can be provided by performing a binary difference operation (e.g., BSDIFF) between old set of metadata and the new set of metadata as shown in the stage 130. In this manner, the process 200 performs a delta compression of the metadata, which reduces the size of the metadata transmitted to the target system because only the difference or delta is required to be sent. The updated set of metadata includes modified location information of the updated set of files. In one example, the updated set of metadata includes modified location information of the updated set of files at the block level of the storage device (e.g., on the target system). In other words, the updated set of metadata indicates that the location of the updated set of files has changed in the file system update.

The process at 230 transmits the set of updated files over a network to a target system. More specifically, the set of updated files updates a file system stored on the target system. Additionally, the process at 235 transmits the updated set of metadata over the network to the target system if the old set of metadata is modified. In some configurations, the set of updated files and/or the updated set of metadata is compressed before transmitting over the network. Although FIG. 2 illustrates that the set of updated files and updated set of metadata are transmitted according to different operations by the process 200, in some configurations the process 200 can transmit the set of updated files and the updated set of metadata in one operation. For instance, the updated set of metadata can be included with the set of updated files and the process 200 can therefore transmit the set of updated files and metadata in one operation (e.g., at 230). The process 200 then ends.

As described above, the file system for OS can be hashed at the block level of the disk to ensure the integrity of the file system. The file system can include free space that can be understood as a location(s) at the block level of the disk where no file(s) or metadata is stored. However, free space at the block level can still contain data (e.g., garbage data). Any free space in the updated file system image therefore can also be also hashed. In some configurations, the subject technology also transmits the free space over the network to the target computer system to update the file system on the target computer. To more efficiently transmit the free space, the subject technology in some configurations performs a write operation that writes zeros at the locations of free space in the updated file system image.

Figure 3:
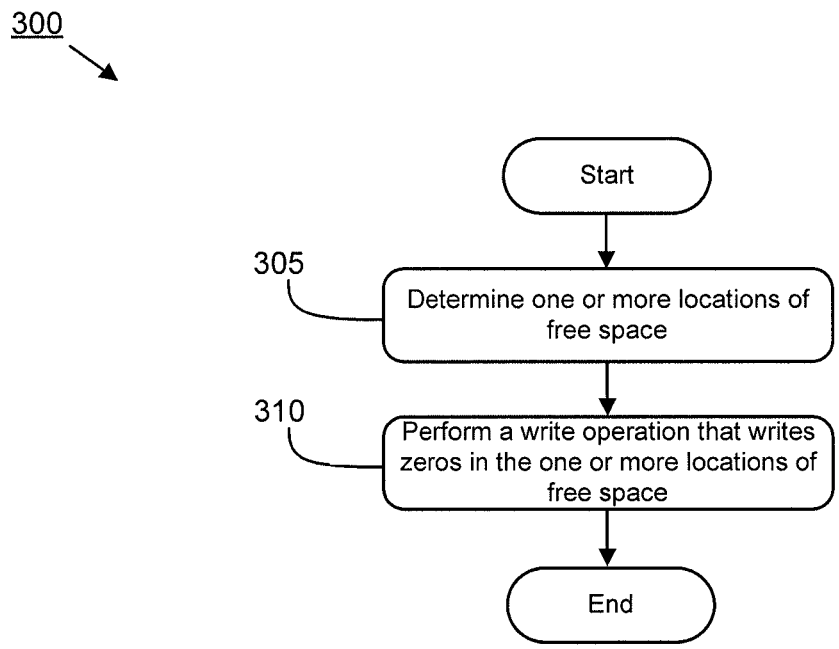
FIG. 3 conceptually illustrates an example process for zeroing locations of free space.

FIG. 3 conceptually illustrates an example process 300 for zeroing locations of free space. The process 300 can be performed conjunctively with the process 200 described above in FIG. 2. More specifically, the process 300 can be performed before transmitting the set of updated files in FIG. 2.

The process 300 begins at 305 by determining one or more locations of free space in an updated file system image. The updated file system image can include one or more different files and can correspond to an image of a file system for an operating system. In one example, the updated file system image is formed by the set of updated files and one or more files that were not updated as described above in FIG. 2 and as shown in the stage 130 in FIG. 1. Free space can be understood as locations at the block level of the disk where no metadata or file is stored (e.g., as indicated by metadata). However, free space at the block level can still contain data (e.g., garbage data). The process 300 at 310 performs a write operation in the one or more locations of free space in the updated file system image. For instance, the write operation writes one or more zeros in the locations of free space at the block level (e.g., to clear up any garbage data). Referring to FIG. 1, the free space located at blocks 1 and 6 of the new file image in the stage 120 can be written with zeros by the process 200 described in FIG. 2. By writing one or more zeros in the locations of free space, the subject technology can improve compression of the updated file system image that updates one or more files and/or metadata for the operating system. In particular, if the process 200 did not write zeroes in the locations of free space, the data at those locations of free space could potentially include random (e.g., garbage) data which would not compress as well (e.g., in comparison to the zeroed locations of free space) in the updated file system image. Zeroing out free space, therefore, enables more effective compression (e.g., a higher compression ratio than without zeroing the free space). The process 300 then ends.

In some configurations, the aforementioned zeroed free space can be included in a set of updated files (e.g., the set of updated files that are transmitted at 230 in FIG. 2). By zeroing the locations of free space, the zeroed free space can be compressed and therefore the size of the payload can be lowered for the set of updated files that are transmitted over the network to the target system.

Figure 4:
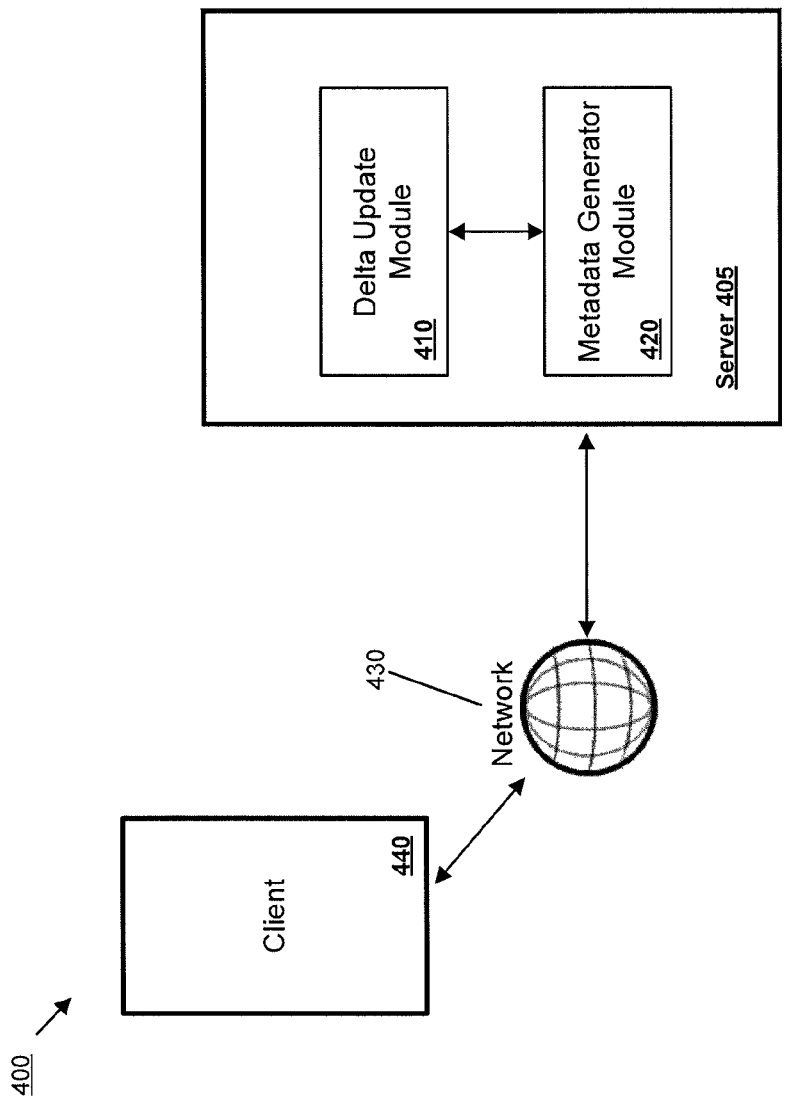
FIG. 4 conceptually illustrates an example computing environment.

FIG. 4 conceptually illustrates an example computing environment including a system for updating a collection of files based on an organization of the files on different blocks of a storage device. In particular, FIG. 4 shows a system 405 for implementing the above described processes FIGS. 1-3. In some configurations, the system 405 is part of an implementation running a particular machine (e.g., a server). The system 405 can include memory and one or more processors. Additionally, the system includes one or more modules stored in memory and configured for execution by the one or more processors.

As shown in FIG. 4, the system 405 includes several modules for providing different functionality. More specifically, the system 405 includes a delta update module 410 and a metadata generator module 420. The delta update module 410 is configured to determine a updated set of files that have been modified in a file system update in order to update an old file system image. The updated set of files updates a corresponding old set of files in the old file system image in one example. The delta update module 410 is further configured to determine whether an old set of metadata associated with the old set of files is modified based on the updated set of files. The delta update module 410 is also configured to generate a set of updated files based on the updated set of files.

In some configurations, the delta update module 410 is further configured to transmit the set of updated files over a network 430 to a target system (e.g., a client system 440). The set of updated files updates a file system stored on the target system. Moreover, the set of updated files includes one or more different operations for the target system to perform. In one example, the set of updated files includes an updated set of metadata (e.g., generated by a metadata generator module 420 described below). The one or more different operations can include a copy operation that copies a file to a different location on a storage device of the target system in which the storage device stores the file system. Additionally, the one or more different operations can include a write operation that determines a difference between a first file in the old file system image and a corresponding second file in file system update and writes the difference to the location of the first file.

The metadata generator module 420 is configured to generate an updated set of metadata for the updated set of files if the old set of metadata is modified. The updated set of metadata includes modified location information of the updated set of files.

As further shown in FIG. 4, each of the aforementioned modules can be configured to communicate between each other. For instance, different data, messages, API calls and returns can be passed between the different modules in the system 405.

The server 405 can communicate over a network 430 with one or more client systems 440. The client system 440 can include a mobile device, a desktop computer, a tablet computer, etc. In some configurations, the server 405 can communicate with the client system(s) 440 over the network 430 to implement different aspects of the processes 100, 200 and 300 described by reference to FIGS. 1, 2 and 3.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

Figure 5:
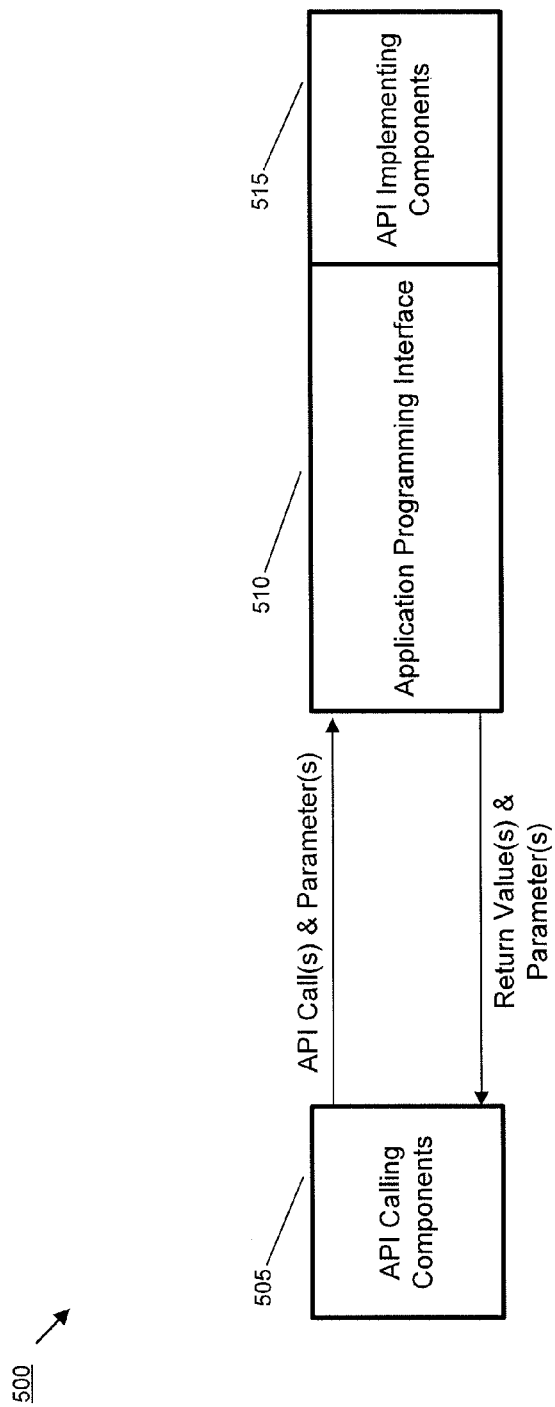
FIG. 5 conceptually illustrates an example application programming interface (API) architecture.

FIG. 5 is a block diagram illustrating an example API architecture, which can be used in some configurations of the subject technology. As shown in FIG. 5, the API architecture 500 includes the API implementing component 515 (e.g., an operating system, a library, a device driver, an API, an application program, software or other module) that implements the API 510. The API 510 specifies one or more functions, methods, classes, objects, protocols, data structures, formats and/or other features of the API-implementing component that can be used by the API-calling component 505. The API 510 can specify at least one calling convention that specifies how a function in the API implementing component receives parameters from the API calling component and how the function returns a result to the API calling component. The API calling component 505 (e.g., an operating system, a library, a device driver, an API, an application program, software or other module), makes API calls through the API 510 to access and use the features of the API implementing component 515 that are specified by the API 510. The API implementing component 515 can return a value through the API 510 to the API calling component 505 in response to an API call.

It will be appreciated that the API implementing component 515 can include additional functions, methods, classes, data structures, and/or other features that are not specified through the API 510 and are not available to the API calling component 505. It should be understood that the API calling component 505 can be on the same system as the API implementing component 515 or can be located remotely and accesses the API implementing component 515 using the API 510 over a network. While FIG. 5 illustrates a single API calling component 505 interacting with the API 510, it should be understood that other API calling components, which can be written in different languages (or the same language) than the API calling component 505, can use the API 510.

The API implementing component 515, the API 510, and the API calling component 505 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 6:
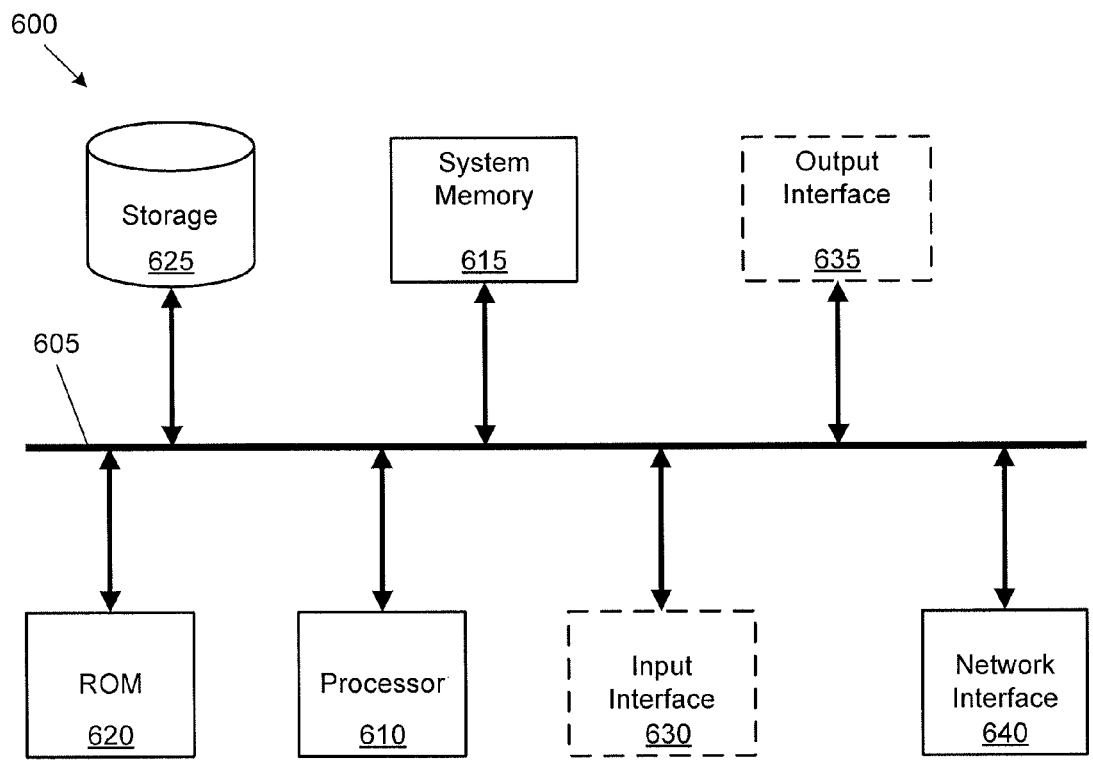
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or any other sort of electronic device. In some configurations, the system 600 can include a television with one or more processors embedded therein. The system 600 includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. Any or all components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method, the method comprising:
   determining an updated set of files that have been modified in a file system update in order to update an old file system image, wherein the updated set of files updates a corresponding old set of files in the old file system image;
   determining whether an old set of metadata associated with the old set of files is modified based on the updated set of files;
   generating a set of updated files based on a binary difference of the updated set of files and the old set of files, wherein the set of updated files comprises blocks deallocated into free space;
   generating an updated set of metadata for the updated set of files based on a binary difference between a new set of metadata and the old set of metadata, wherein the updated set of metadata includes the binary difference between location information of the updated set of files and location information of the old set of files, wherein the location information of the updated set of files and the location information of the old set of files comprise respective block indexes at a block level of a plurality of blocks on a storage device;
   transmitting the set of updated files and the free space over a network to a target system.

2. The method of claim 1,
   wherein the set of updated files updates a file system stored on the target system.

3. The method of claim 2, further comprising:
   transmitting the updated set of metadata over the network to the target system if the first set metadata is modified.

4. The method of claim 3, wherein the updated set of metadata is compressed before transmitting over the network.

5. The method of claim 1, wherein the set of updated files is compressed before transmitting over the network.

6. The method of claim 1, further comprising:
   determining one or more locations of free space in an updated file system image; and performing a write operation in the one or more locations of free space in the updated file system image, wherein the write operation writes one or more zeros in the locations of free space.

7. The method of claim 6, further comprising:
compressing the free space in the updated file system image, such that the generated set of updated files comprises the compressed free space.

8. The method of claim 1, wherein the old set of metadata includes location information of the old set of files at a block level of the storage device.

9. The method of claim 8, wherein the location information of the old set of files is modified from respective locations at the block level of the storage device.

10. The method of claim 1, wherein determining whether the old set of metadata associated with the old set of files is modified comprises:
determining whether metadata including at least one of location information, creation timestamp, modification timestamp, access timestamp, directory entries for one or more directories, bitmap information, and file system information is modified.

11. The method of claim 1, wherein the updated set of metadata includes modified location information of the updated set of files at the block level of the storage device.

12. The method of claim 11, wherein each operation operates on one or more blocks of a file system of a target system.

13. The method of claim 11, wherein the one or more operations to perform includes one of a copy operation or a write operation.

14. The method of claim 13, wherein the copy operation copies a file to a different location on the target disk.

15. The method of claim 13, wherein the write operation comprises one of a difference operation, replace operation, and replace with uncompression operation.

16. The method of claim 1, wherein the updated set of files includes a subset of a total number of files of a file system that have been modified in the file system update.

17. The method of claim 1, wherein each file of the set of updated files includes an ordered list of one or more operations to perform.

18. A system, the system comprising:
memory;
one or more processors;
one or more modules stored in memory and configured for execution by the one or more processors, the modules comprising:
a delta update module configured to determine an updated set of files that have been modified in a file system update in order to update an old file system image, wherein the updated set of files updates a corresponding old set of files in the old file system image, the delta update module configured to determine whether an old set of metadata associated with the old set of files is modified based on the updated set of files, the delta update module configured to generate a set of updated files based on the updated set of files, the set of updated files comprising blocks deallocated into free space, the delta update module configured to transmit the set of updated files over a network to a target system; and
a metadata generator module configured to generate an updated set of metadata for the updated set of files based on a binary difference between a new set of metadata and the old set of metadata, wherein the updated set of metadata includes the binary difference between location information of the updated set of files and location information of the old set of files, wherein the location information of the updated set of files and the location information of the old set of files comprise respective block indexes at a block level of a plurality of blocks on a storage device.

19. The system of claim 18, wherein the set of updated files updates a file system stored on the target system.

20. The system of claim 19, wherein the set of updated files includes one or more different operations for the target system to perform.

21. The system of claim 20, wherein the one or more different operations includes a copy operation that copies a file to a different location on a storage device of the target system, wherein the storage device stores the file system.

22. The system of claim 20, wherein the one or more different operations includes a write operation that determines a difference between a first file in the old file system image and a corresponding second file in file system update and writes the difference to the location of the first file.

23. The system of claim 19, wherein the set of updated files includes the updated set of metadata.

24. A non-transitory machine-readable medium comprising instructions stored therein, which when executed by a machine, cause the machine to perform operations comprising:
determining an updated set of files that have been modified in a file system update in order to update an old file system image, wherein the updated set of files updates an old set of files in the old file system image;
determining whether an old set of metadata associated with the old set of files is modified based on the updated set of files;
generating a set of updated files based on a binary difference of the updated set of files and the old set of files, wherein the set of updated files comprises blocks deallocated into free space;
generating an updated set of metadata for the updated set of files based on a binary difference between a new set of metadata and the old set of metadata, wherein the updated set of metadata includes the binary difference between location information of the updated set of files and location information of the old set of files, wherein the location information of the updated set of files and the location information of the old set of files comprise respective block indexes at a block level of a plurality of blocks on a storage device;
transmitting the generated set of updated files and the free space over a network to a target system, wherein the generated set of updated files updates a file system stored on the target system; and
transmitting the updated set of metadata over the network to the target system.

25. The non-transitory machine-readable medium of claim 24, further comprising:
determining one or more locations of free space in an updated file system image, wherein the update file system image includes the generated set of updated files; and
performing a write operation in the one or more locations of free space in the updated file system image, wherein the write operation writes one or more zeros in the locations of free space.

26. The non-transitory machine-readable medium of claim 25, wherein the write operation only writes a plurality of zeros in the locations of free space.

* * * * *